United States Patent [19]

Soubliere

[11] Patent Number: 5,014,959
[45] Date of Patent: May 14, 1991

[54] CLOSURES

[75] Inventor: Marc P. Soubliere, London, Canada

[73] Assignee: Northern Telecom Limited, Montreal, Canada

[21] Appl. No.: 538,070

[22] Filed: Jun. 14, 1990

[51] Int. Cl.5 ............................................. H04M 1/00
[52] U.S. Cl. .................................... 248/551; 292/48; 70/123
[58] Field of Search ............... 248/551, 553, 500, 506; 292/53, 221, 52, 48; 379/454, 445; 70/123

[56] References Cited

U.S. PATENT DOCUMENTS

| | | | |
|---|---|---|---|
| 1,697,557 | 1/1929 | Drenning | 292/52 |
| 3,338,611 | 8/1967 | Bertovich, Jr. et al. | 292/52 X |
| 3,391,256 | 7/1968 | Nawman | 379/445 |
| 3,868,483 | 2/1975 | Trimmer et al. | 379/445 X |
| 4,066,307 | 1/1978 | Barding | 248/553 X |
| 4,246,451 | 1/1981 | Nix | 248/553 |
| 4,495,787 | 1/1984 | Comstock | 248/553 X |
| 4,940,296 | 7/1990 | McGough | 248/553 X |

Primary Examiner—Karen J. Chotkowski
Attorney, Agent, or Firm—R. J. Austin

[57] ABSTRACT

A closure, particularly, a telephone closure base with two closure members and a movable shear locking member. In a closed condition of the closure, aligned apertures of the two closure members may receive the locking member to hold the assembly closed. A part of one of the closure members having the aperture is flexible and tensile and has a flexure position such that, when an opening force is applied to the assembly with the locking member extending through the apertures, the flexible part is flexed under tension and is urged against an opposing surface of the other closure member formed with the corresponding aperture. This flexing action places the locking member mainly in shear while minimizing any bending forces upon the locking member.

18 Claims, 5 Drawing Sheets

CLOSURES

This invention relates to closures.

Enclosures are known comprising two closure members, one being mountable upon the other. Such closures are typical for public telephone terminals in which one closure member is a mount for mounting the terminal upon a wall and the other closure member is a cover having an end wall which provides a front face for the terminal and which carries manually operable controls for the telephone together with means for detachably holding a handset.

Normally in a closure used for public telephone terminals, shear locking elements or bars are used to hold the covers onto the mounts so as to prevent their removal unless by persons authorized. The shear locking members are interconnected by a mechanism which can be operated by a lever or handle and which in turn is secured to a single keyed lock. This enables all of the shear locking members to be moved simultaneously into and out of locking positions for retaining the cover upon a mount. In the locking positions, the locking members extend through aligned apertures in the cover and the mount. Assembly tolerances accumulate in the manufacture of the parts whereby a close fit has been found to be impossible between cover and mount elements so that the shear locking members extend through clearances between the cover and mount. As a result, although the locking members are supposed to be submitted only to loads in shear if an effort is made to remove the cover from the mount, the undesirable clearances result in locking members also being subjected to bending moments between their positions at which they engage sides of the apertures. Hence, the locking members need to have sufficient strength not only to resist shear forces but also to resist bending forces which may be applied to them.

The present invention provides a closure in the use of which, bending forces are minimized upon the shear locking members.

Accordingly, the present invention provides a closure comprising a first and second closure members and a movable shear locking member, the first closure member having an end wall and a receiving element having an aperture for receiving the locking member, the receiving element outstanding from the end wall and the second closure member comprising a flexible tensile member, the flexible tensile member also formed with an aperture for receiving the locking member, the apertures being aligned upon assembly of the closure members with a flexible tensile member disposed alongside an opposing face of the receiving element and with the shear locking member in a locking position extending through the aligned apertures to secure the closure members together, the flexible tensile member being shaped so that in the assembled condition of the closure members, the flexible tensile member extends in a direction from the end wall and beyond the receiving element to a position of flexure of the flexible tensile member on the other side of a plane occupied by the opposing face of the receiving element whereby any separation force applied to the assembled closure members places the locking member in shear and also tensions the flexible tensile member while flexing it about its position of flexure to urge the flexible tensile member against the opposing surface of the receiving element.

Thus in the closure of the invention, any separation force acts upon the flexible tensile member to urge it against the receiving element thereby ensuring that the distance between the receiving element and the tensile member is minimized so that the securing member is subjected to negligible bending forces.

In a preferred arrangement, the flexible tensile member is resilient and is resiliently urged towards the receiving element in the assembled condition of the closure members. In this case the flexible tensile member normally is urged into contact with the receiving element. However, any separation force applied to the closure members applies a resultant force additional to that provided by the resiliency of the flexible tensile member so as to urge the tensile member with greater force towards the receiving element thereby ensuring that no gap exists between the receiving element and the tensile member.

The inventive concept is useful for any closure using shear securing members and for which it is required that the bending of the securing members is minimized. In particular the closure of the invention is useful as an enclosure for electronic equipment, for instance for use as a closure for a public telephone terminal.

According to a further aspect of the invention, there is provided a closure comprising a first and second closure members and two shear locking members, the first closure member having an end wall and two receiving elements having apertures each for receiving a respective locking member, the receiving elements outstanding from the end wall and disposed opposite to one another across the end wall, and the second closure member comprising two flexible tensile members, one associated with each receiving element, each flexible tensile member formed with an aperture for receiving a respective locking member, and upon assembly of the members, each flexible tensile member is disposed alongside an opposing face of a corresponding receiving element with respective apertures aligned and with the respective locking member in a locking position extending through the aligned apertures to secure the closure members together, each flexible tensile member being shaped so that in the assembled condition of the closure members, the flexible tensile member extends in a direction from the end wall and beyond its respective receiving element to a position of flexure of the flexible tensile member on the other side of a plane occupied by the opposing face of the respective receiving element whereby any separation force applied to the assembled closure members places the locking members in shear and also tensions the flexible tensile members while flexing them about their positions of flexure to urge the flexible tensile members against the opposing surfaces of the receiving elements.

One embodiment of the invention will now be described, by way of example, with reference to the accompanying drawings, in which.

Figure 1:
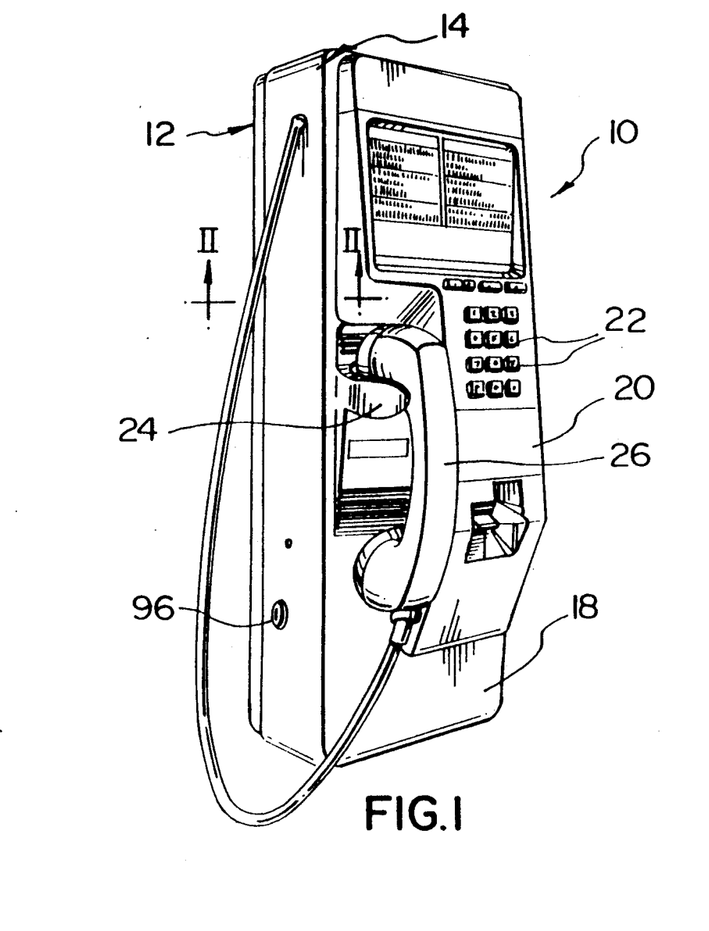
FIG. 1 is a perspective view of a public telephone terminal.
Figure 4:
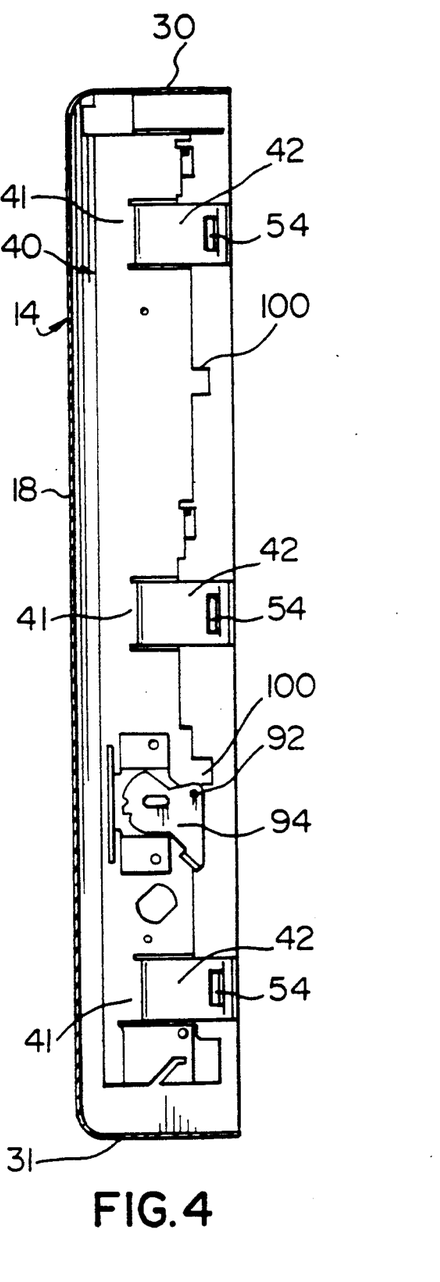
FIG. 4, on the scale of FIG. 3, is a side elevational view of a side wall of the other closure member taken in the direction of arrow IV in FIG. 2.

In the embodiment and as shown in FIG. 1, a public telephone terminal 10 comprises a closure having two closure members which in an assembled condition of the closure members houses electronic parts of the terminal. As shown by FIG. 1, one of the closure members is a wall mount 12 while the other closure member is a cover 14 which covers the mount 12 and provides an enclosed chamber 16 (see FIG. 2) within which the electronic equipment is housed. The closure is generally rectangular with its longitudinal axis extending in a vertical direction when mounted upon a wall as shown in FIG. 1. The cover has a cover base wall 18 which, in fact, provides a front face to the terminal, and a die-cast metal embellishment 20 extends outwardly from the base wall 18. Upon the embellishment 20 and the base wall 18 are provided all of the requirements necessary for public operation of the telephone. These include a set of dialing buttons 22 extending through the embellishment from a dialing pad and a mount 24 upon the base wall 18 for receiving a handset 26 of the phone. The cover 14 also has opposed cover side walls 28 which extend along the length of the cover and top and bottom walls 30 and 31 (see particularly FIGS. 4, 5 and 6).

Figure 3:
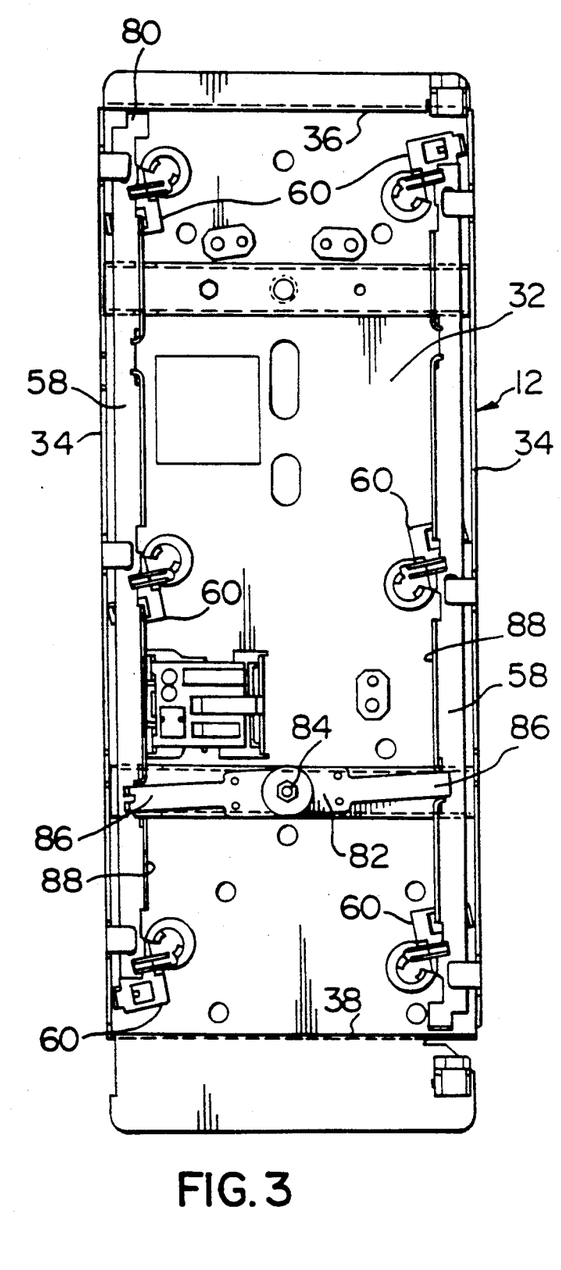
FIG. 3 is a plan view of one closure member of the terminal and on a larger scale than FIG. 1.

The wall mount 12 comprises an end wall 32 for mounting the closure upon a vertical support wall and side walls 34 spaced apart opposite to one another across the end wall 32 (see FIG. 3). In addition, the wall mount 12 has top and bottom walls 36 and 38 which extend laterally of the mount between the side walls 34.

The wall mount 12 and cover 14 are so dimensioned that with the cover mounted upon the wall mount, the side walls 28 and top and bottom walls 30 and 31 extend completely around the side walls 34 and top and bottom lateral walls 36 and 38 of the wall mount. This is shown in FIGS. 2, 5 and 6 particularly.

Figure 2:
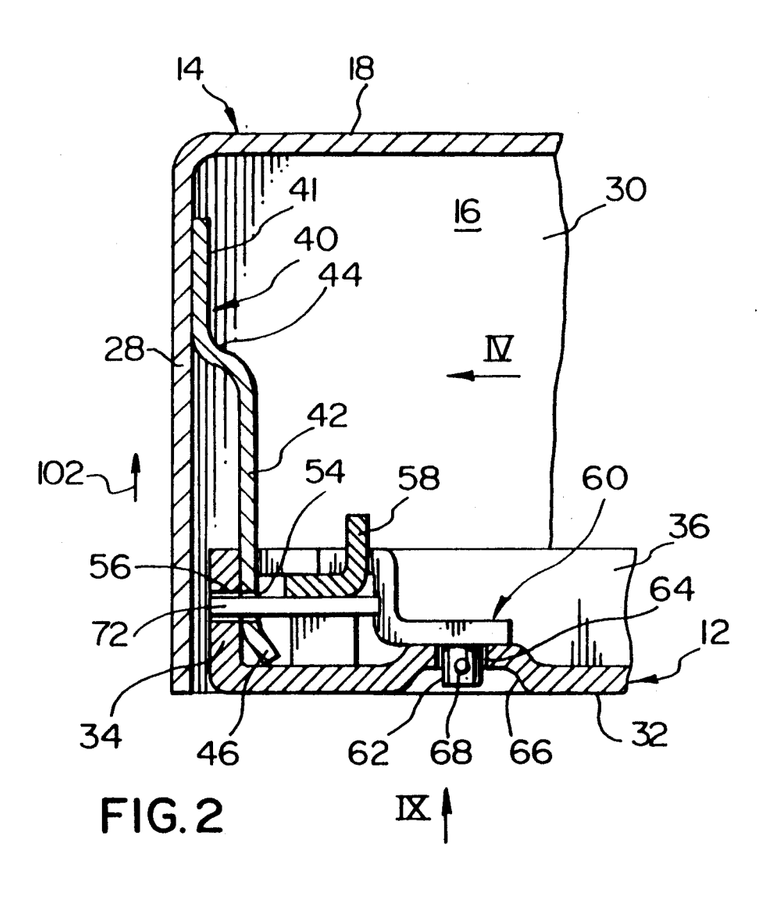
FIG. 2 is a cross-sectional view through one side of the terminal taken along line II—II in FIG. 1 and on a much larger scale.

With reference to FIGS. 2, 4, 5 and 6, the cover 14 is provided with two elongate metal strips 40 each of which is secured by an edge region 41 along the inside surface of a respective side wall 28 of the cover. Each strip 40 is integrally formed with a plurality, (namely three), of resiliently flexible tensile members 42 which extend in relatively spaced positions from the edge region 41 of the strip and are bent at positions of flexure 44 as they leave the edge region so as to be spaced away from and lie substantially parallel to the respective side wall 28. The tensile members 42 extend towards the free ends of the side walls 28 to terminate in free ends 46. These free ends 46 are bent slightly outwardly (FIG. 2) for reasons to be described. Each metal strip 40 thus provides a mounting region for carrying each flexible tensile member 42 upon the respective side wall 28. As may be seen from FIGS. 2, 5 and 6, with the wall mount 12 and cover 14 assembled together, each side wall 34 of the wall mount is disposed between the cover side wall 28 and the tensile members 42 associated with that side wall. Furthermore, the dimensions of the closure members are such that as the cover is mounted upon the wall mount 12, the bent free ends 46 of the tensile members 42 guide the flexible members inside the side walls 34 while resiliently flexing the flexible tensile members 42 so that, in the assembled condition, the members 42 are resiliently urged against the opposing inner face of a respective side wall 34 as shown by FIG. 2.

Figures 5, 9:
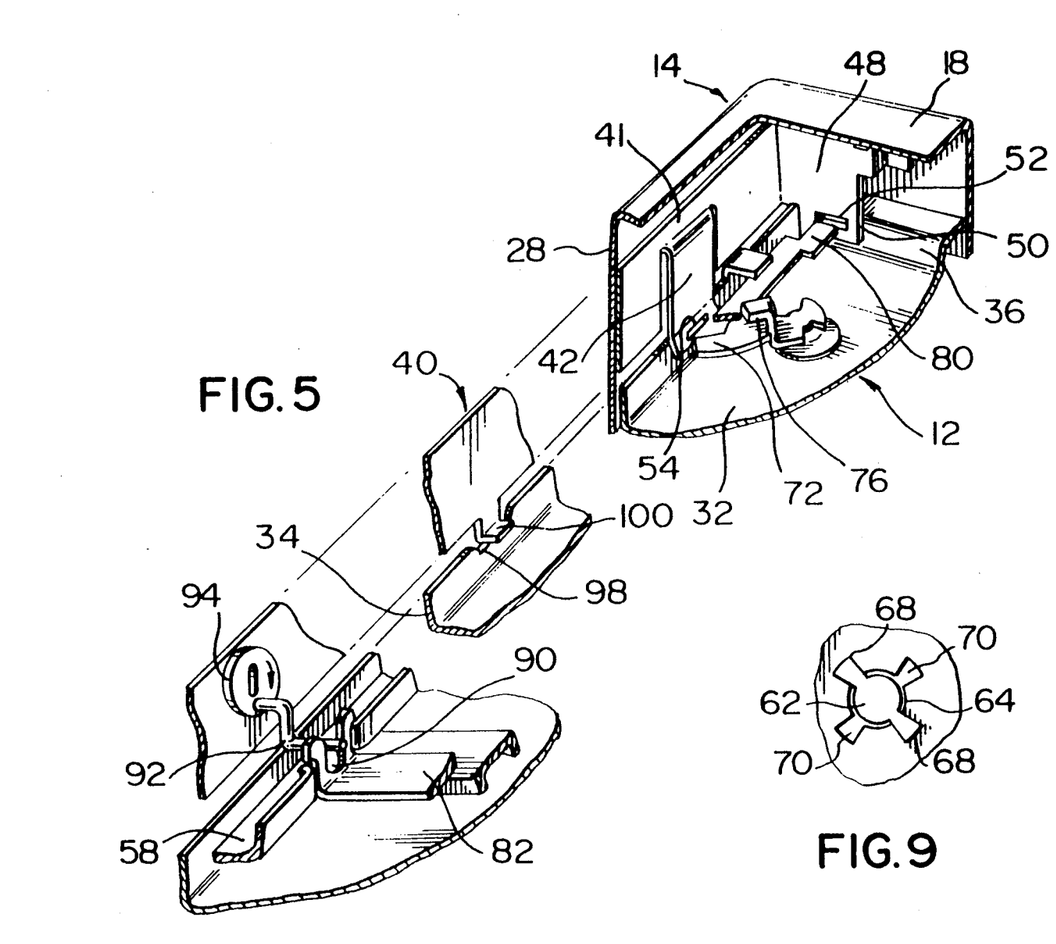
FIG. 5 is an isometric view, to a larger scale than FIG. 3, of the assembled closure of the terminal with parts removed for clarity and showing a locking mechanism in an unlocked position.
FIG. 9 is a view of a detail of one closure member in the direction of arrow IX in FIG. 2.
Figure 6:
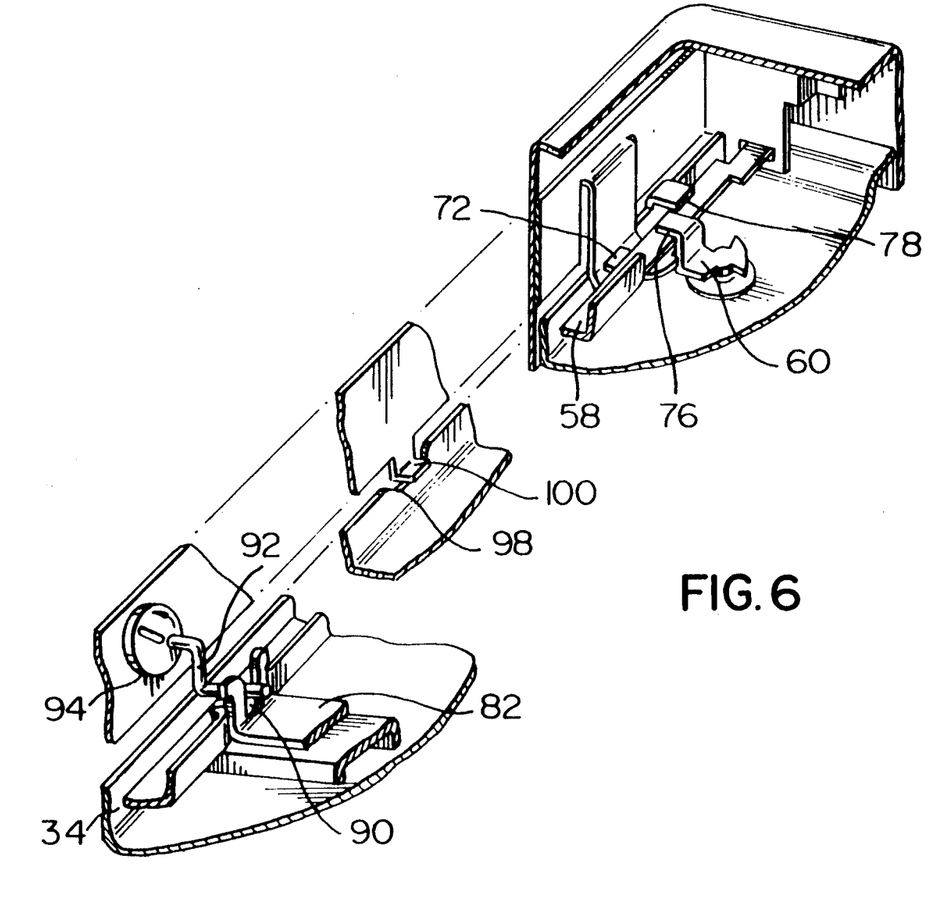
FIG. 6 is a view similar to FIG. 5 and showing the locking mechanism in a locked position.

In addition, as shown by FIGS. 5 and 6, one metal strip 40 is bent at its upper end to provide a flange 48 which extends as a tensile member 50 for location against and within the top lateral wall 36 of the wall mount 12 in the assembled condition. The tensile member 50 has a rectangular hole 52 for alignment with a corresponding hole (not shown) upon the top lateral wall 36. Further, each of the flexible tensile members 42 is provided with a rectangular aperture 54 which is in alignment with a similarly sized aperture 56 in a corresponding side wall 34 of the mount in the assembled condition of the cover and wall mount.

Figure 7:
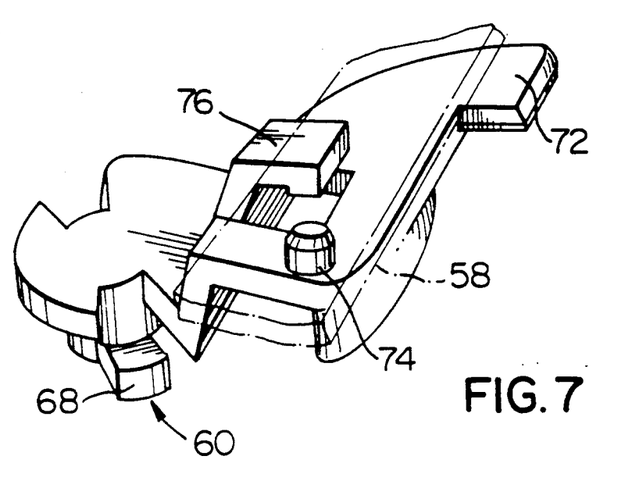
FIG. 7 is an isometric view of a locking member of the locking mechanism and to a very large scale.
Figure 8:
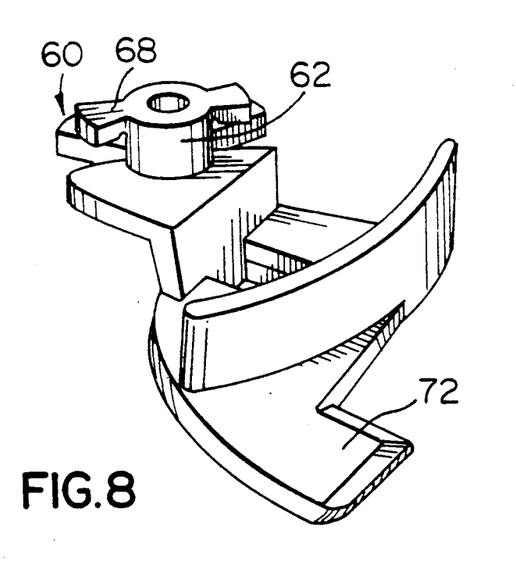
FIG. 8 is an isometric view of the locking member taken from the side opposite to FIG. 7.

The wall mount and cover have a releasable locking mechanism for holding them in their assembled conditions. As shown particularly by FIGS. 2, 3, 5 and 6, the locking mechanism comprises two actuators in the form of metal bars 58 which are in laterally spaced position between the side walls 34 of the mount while extending substantially parallel with the side walls so as to bridge each of the slots 56. Each metal bar 58 is associated with a set (namely three) of locking members 60 which are of molded construction (FIGS. 7 and 8) and have necks 62 of circular section by which each of the locking members 60 is pivotally mounted through a hole 64 in an embossed region 66 of the base wall 18 of the wall mount 12 (FIGS. 2 and 9). As will be described, each of the locking members 60 is subject to a controlled limited angular movement about its pivotal axis during normal operation. However, each locking member 60 has at one end of the neck 62 two localized diametrically opposed radial projections 68 which lie on the outside of the mount 12 within the embossed region 66. These projections 68 serve to retain the locking member 60 in its mounted position during normal usage. However, if the locking member is moved angularly beyond its controlled limited angular movement positions such as when disconnected from its actuator (i.e. metal bar 58) then the projections 68 may be caused to align with lateral slots 70 extending from the respective hole 64 to enable the locking member to be removed through the hole 64 for dismantling from the mount. The locking member may be assembled to the wall mount by a similar alignment process. This type of design avoids the necessity of using rivets or screw-threaded means for mounting the locking members 60 in position to the wall mount.

Each locking member 60 has a shear locking element 72 (see FIG. 7) which extends generally radially from the pivotal axis of the locking member. Each locking member 60 is pivotally movable in one direction to locate its associated locking element 72 through aligned apertures 54 and 56 in the associated flexible tensile member 42 and side wall 28 so as to locate it in a locking position. Each side wall thus provides a receiving element for locking members 60 to effect the locking operation. Alternatively, each locking member 60, is pivotally movable in the opposite direction so as to remove the locking element from its locking position.

Each locking member 60 is operably connected to its metal bar 58 by means of a circular driving spigot 74

(FIG. 7) which extends upwardly through a corresponding hole provided in the associated metal bar 58. Each locking member 60 is formed so as to allow for longitudinal movement of its respective metal bar 58 while positioning the metal bar with respect to the base wall 18 of the mount. This positioning is performed by the location of the locking element 72 on one side of the bar as shown in FIGS. 5 and 6 by a holding projection 76 of the locking member, the holding projection shaped so as to extend around the other side of the metal bar while lying in close relationship to it. At spaced intervals, each side wall 34 is provided with a laterally extending flange 78 which also passes across an associated metal bar 58 to assist in holding it in position.

As may be seen, therefore, each of the metal bars 58 is movable alternatively in one direction and the other along its longitudinal axis. During this movement, it serves to pivot its locking members 60 about their pivotal axes for a controlled limited angular movement for disposing the locking elements 72 into and out of locking positions. In addition, the left-hand metal bar 58 shown in FIGS. 3, 5 and 6, has an upper end 80 which is aligned with the hole 52 of the cover and the corresponding hole in the end wall 36 to serve as a further locking member as will be described.

The two metal bars 58 provide means for moving the locking elements 72 simultaneously into or out of their locking positions. This means also includes means for operably connecting the actuators so as to ensure their simultaneous longitudinal movement. The means for operably connecting the actuators in this way comprises an elongate operating member 82 which is pivoted intermediate its ends at position 84 (see FIG. 3). The ends 86 of the member 82 pass through gaps in edge flanges 88 of the metal bars 58 with the ends 86 of the elongate member engaging the flanges at the gaps. Hence, pivotal movement of the operating member 82 in one direction or the other will cause simultaneous movement of the metal bars 58 in their longitudinal directions with one bar moving upwardly and the other one downwardly. To enable the operating member 82 to be operated with the cover 14 mounted upon the wall mount 12, one end 80 of the operating member 82 is provided with a slot 90 (see FIGS. 5 and 6) into which is received an operating peg 92 provided upon a plate 94 pivotally received on a side wall 28. This plate 94 is controllably pivoted to effect operation of the peg within the slot 90 so as to pivot the elongate member 82 in the appropriate direction by insertion of an appropriate key through a keyhole slot 96 (see FIG. 1) to operate the locking mechanism.

As the closure is to be mounted upon a wall as shown in FIG. 1 then the weight of the cover must be taken by the wall mount 12. This is effected by providing cooperable projections and projection receiving slots upon the side walls of the mount and of the cover. In this particular embodiment, each side wall 34 of the wall mount has two spaced slots 98 (FIG. 3). As shown in FIG. 5, the slots 98 have narrowing entrances for guiding corresponding projections 100 which are integrally formed with an elongate metal strip 40.

To assemble the cover upon the wall mount 12, it is first necessary to ensure that all of the locking elements 72 are out of their locking positions. This is effected by pivoting the operating member 82 in an anticlockwise direction to the position shown in FIG. 3 so that the left-hand metal bar 58 moves downwardly and the right-hand bar moves upwardly.

The cover 14 is then mounted upon the wall mount 12 and is offered to the wall mount so that the bent ends 46 of the flexible tensile members 42 engage the side walls 34 and are led between the side walls so as to resiliently flex the tensile members. The cover is mounted correctly in position when as shown in FIG. 2, the apertures 54 and 56 are aligned. In this position, the flexible tensile members 42 are resiliently urged against the opposing surface of the side walls 34 so that their is no gap between them. The locking members 60 are then out of their locking positions, (FIG. 5). The locking mechanism is then operated to move the locking elements 72 simultaneously into their locking positions. This is effected by moving the left-hand metal bar 58 upwardly and the right-hand bar downwardly under the influence of the plate 94 and operating member 82 so that the locking members 60 are pivoted to move the locking elements 72 through pairs of aligned apertures 54 and 56. This is the position shown in FIGS. 2 and 6. In addition, during movement of the left-hand bar 58 in the vertical direction, its end 80 passes through the hole 52 and the aligned hole (not shown) in the top lateral wall 36 of the wall mount. Through all positions of movement as shown in FIGS. 5 and 6, the metal bars 58 are held between the shear locking elements 72 and the projections 76 so as to prevent lateral displacement of the bars.

Should any unauthorized person (i.e. without an operating key) attempt to remove the cover from the wall mount 12, then any separating force applied to the cover (i.e. in the direction of arrow 102 in FIG. 2) immediately places all the locking elements 72 in shear and also tensions each of the flexible tensile members 42 between their apertures 54 and the mounting regions 41. As a result, the tensile force attempts to straighten each of the flexible tensile members 42 by bending it about its position of flexure 44 disposed on the other side of a plane occupied by the face of the side wall 34 which opposes the tensile members 42. Clearly, any tendency for the tensile members 42 to become straightened causes them to move towards the respective side walls 28 of the cover and causes the tensile members to apply a force upon the opposing faces of the side walls 34 which is additional to that provided by the resiliency of the tensile members 42 themselves. It follows therefore that upon the application of a separating force to the closure, positive pressure against the side walls 34 is increased thereby avoiding any possibility of a gap developing between the tensile members 42 and the side walls. As a result, the beam length is minimized along each of the locking elements 72 between positions at which the tensile members 42 and the side walls 34 apply the separating force to the locking elements. The resultant bending moment is thus also minimized. The forces applied to the locking elements are thus maximized as shear forces. For any particular material, the locking elements 72 may be designed while substantially ignoring any design requirements for accommodating bending moments. Another advantage which is obtained from the above construction is that because of the resilient nature of the tensile members 42 and also their action in moving towards the side walls 34 under a separation load, then the cover 14 is tightly mounted upon the wall mount 12 and the degree of tightness increases as the separation force increases. Thus, the cover 14 is not loosely accommodated by the wall mount and has a tightness of fit which is not subject to rattling of the closure members upon application of the separation force.

What is claimed is:

1. A closure comprising a first and a second closure members and a movable shear locking member, the first closure member having an end wall and a receiving element housing an aperture for receiving the locking member, the receiving element outstanding from the end wall and the second closure member comprising a flexible tensile member, the flexible tensile member also formed with an aperture for receiving the locking member, the apertures being aligned upon assembly of the closure members with the flexible tensile member disposed alongside an opposing face of the receiving element and with the shear locking member in a securing position extending through the aligned apertures to secure the closure members together, and the flexible tensile member being shaped so that in the assembled condition of the closure members, the flexible tensile member extends in a direction from the end wall and beyond the receiving element to a position of flexure of the flexible tensile member on the other side of a plane occupied by the opposing face of the receiving element whereby any separation force applied to the assembled closure members places the locking member in shear and also tensions the flexible tensile member while flexing it about its position of flexure to urge the flexible tensile member against the opposing surface of the receiving element.

2. A closure according to claim 1 wherein the flexible tensile member is resilient and is resiliently urged towards the receiving element in the assembled condition of the closure members and any separating force applied to the assembled closure members applies a resultant force which is additional to that provided by the resiliency and which serves to flex the flexible tensile member and urge it towards the receiving element.

3. A closure according to claim 1 wherein the second closure member is a cover of the closure and has a cover base wall and a cover side wall outstanding from the base wall, the flexible tensile member having a mounting region by which it is secured to the cover side wall, and the flexible tensile member extending from the mounting region and from its position of flexure to a region in spaced relationship from the cover side wall to enable the receiving element to be disposed between the cover side wall and the flexible tensile member in the assembled condition of the closure members.

4. A closure according to claim 2 wherein the shear locking member is pivotally mounted upon the end wall for pivotal movement into and out of its securing position.

5. A closure according to claim 1 wherein the first closure member is a mount for securing the closure to a support and the second closure member is a cover having a cover base wall and a cover side wall extending from the base wall, the flexible tensile element having a mounting region secured to the cover side wall and the flexible tensile element extending from the mounting region and from its position of flexure to a region in spaced relationship from the cover side wall to enable the receiving element to be disposed between the cover side wall and the flexible tensile member in the assembled condition of the closure members.

6. A closure comprising a first and second closure members and two shear locking members, the first closure member having an end wall and two receiving elements having apertures, each for receiving a respective locking member, the receiving elements outstanding from the end wall and disposed opposite to one another across the end wall, and the second closure member comprising two flexible tensile members, one associated with each receiving element, each flexible tensile member formed with an aperture for receiving a respective locking member, and upon assembly of the members, each flexible tensile member is disposed alongside an opposing face of a corresponding receiving element with the respective apertures aligned and with the respective locking member in a locking position extending through the aligned apertures to secure the closure members together, each flexible tensile member being shaped so that in the assembled condition of the closure members, the flexible tensile member extends in a direction from the end wall and beyond its respective receiving element to a position of flexure of the flexible tensile member on the other side of a plane occupied by the opposing face of the receiving element whereby any separation force applied to the assembled closure members places each of the locking members in shear and also tensions the flexible tensile members while flexing them about their positions of flexure to urge the flexible tensile members against the opposing surfaces of the receiving elements.

7. A closure according to claim 6 wherein the second closure member comprises a set of flexible tensile members and each receiving element is a side wall of the first closure member, each receiving element formed with a plurality of apertures along its length and each set of the flexible tensile members is correspondingly spaced apart for alignment of their apertures with the apertures of each side wall of the first closure member upon assembly of the closure members, and a set of shear locking members is provided for each set of flexible tensile members.

8. A closure according to claim 7 wherein the second closure member is a cover of the closure and has a cover base wall and cover side walls outstanding from the cover base wall, and the set of flexible tensile members for each side wall are integral with and extend from an elongate strip which is secured to a respective cover side wall, each flexible tensile member extending from its strip and from its position of flexure to a region in spaced relationship from the respective cover side wall to enable a respective side wall of the first closure member to be disposed between the cover side wall and its associated flexible tensile members in the assembled condition of the closure members.

9. A closure according to claim 8 comprising means for moving each of the locking members simultaneously into or out of their locking positions.

10. A closure according to claim 9 wherein the first closure member is a mount for securing the closure to a support, and the means for moving each of the locking members comprises two actuators carried upon the end wall of the mount in laterally spaced apart positions between the side walls of the mount, the actuators being associated one with each set of shear locking members to move the locking members simultaneously into and out of their locking positions upon longitudinal movement of the actuators, means being provided for causing simultaneous longitudinal movement of the actuators.

11. A closure according to claim 10 wherein the means for causing simultaneous movement of the actuators comprises an operating member extending between the actuators and pivotally mounted upon the end wall of the mount, pivotal movement of the operating member in either direction effecting a corresponding longitudinal movement of each actuator.

12. A closure according to claim 11 wherein each shear locking member is pivotally mounted about a pivotal axis upon the end wall of the mount, each locking member having a pivotal connection to a respective actuator spaced from said pivotal axis whereby longitudinal movement of the actuator in the appropriate direction applies a pivoting movement to the locking member to move it into or out of its locking position.

13. A closure according to claim 12 wherein each locking member extends across one side of its respective actuator and a holding projection of the locking member is positioned at the other side of the actuator to hold the actuator in position upon the mount.

14. A closure according to claim 13 wherein each side wall of the mount has a lateral flange extending over the other side of each actuator to assist the holding projection to hold the actuator in position.

15. A closure according to claim 12 wherein each locking member has a limited angular movement about its pivotal axis during movement of the locking member into and out of its locking position and has a neck pivotally received in a hole in the end wall of the mount and a localized lateral projection at one end of the neck for retaining the locking member in its pivotal position during operation of the locking member, the hole formed with a lateral slot for alignment with the lateral projection upon pivotal movement of the locking member beyond its limited angular movement after disconnection from its actuator, to allow for removal of the locking member.

16. A closure according to claim 10 wherein the mount has a lateral wall extending between side walls of the mount and the cover has another tensile member which is disposed alongside the lateral wall in the assembled condition of cover and mount, the lateral wall and the other tensile member having holes which are aligned in the assembled condition of cover and mount, and one of the actuators has an end which moves through the aligned holes to act as an additional locking member when the actuator moves longitudinally to move the other locking members into their securing positions.

17. A closure according to claim 10 wherein the mount is for mounting upon a vertical wall and the cover and each side wall of the mount are provided with a cooperable projection and projection receiving slot, the projections receivable within the slots upon assembly of the mount and cover so as to support the weight of the cover upon the side wall of the mount.

18. A closure according to claim 17 wherein each slot is provided in a side wall of the mount and each projection is integrally formed with a respective elongate strip and its flexible tensile members.

* * * * *